United States Patent
Choi et al.

(10) Patent No.: US 11,689,892 B2
(45) Date of Patent: Jun. 27, 2023

(54) APPROACH TO USE POSITIONING REFERENCE SIGNAL(S) (PRS(S)) TRAVELING NON LINE-OF-SIGHT (NLOS) TRANSMISSION PATHS AND MAP INFORMATION FOR POSITIONING OF USER EQUIPMENTS (UES)

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Fairless Hills, PA (US); Piyush Gupta, Bridgewater, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/446,802

(22) Filed: Sep. 2, 2021

(65) Prior Publication Data

US 2022/0078581 A1   Mar. 10, 2022

Related U.S. Application Data

(60) Provisional application No. 63/074,984, filed on Sep. 4, 2020.

(51) Int. Cl.
| | |
|---|---|
| *H04W 4/029* | (2018.01) |
| *G01S 5/12* | (2006.01) |
| *H04L 5/00* | (2006.01) |
| *H04W 4/44* | (2018.01) |

(52) U.S. Cl.
CPC ............... *H04W 4/029* (2018.02); *G01S 5/12* (2013.01); *H04L 5/0048* (2013.01); *H04W 4/44* (2018.02)

(58) Field of Classification Search
None
See application file for complete search history.

(56) References Cited

U.S. PATENT DOCUMENTS

| | | | |
|---|---|---|---|
| 10,908,299 B1* | 2/2021 | Tadayon | G01S 5/0294 |
| 2014/0221005 A1 | 8/2014 | Marshall et al. | |
| 2019/0166453 A1* | 5/2019 | Edge | G01S 5/06 |
| 2019/0238658 A1 | 8/2019 | Shimizu et al. | |
| 2019/0302220 A1 | 10/2019 | Kumar et al. | |
| 2020/0191979 A1* | 6/2020 | Lindskog | G01S 5/0221 |
| 2020/0267681 A1* | 8/2020 | Ferrari | H04B 7/02 |

OTHER PUBLICATIONS

International Search Report and Written Opinion—PCT/US2021/049055—ISA/EPO—dated Dec. 23, 2021.

* cited by examiner

*Primary Examiner* — Adolf Dsouza
(74) *Attorney, Agent, or Firm* — Patterson + Sheridan, L.L.P.

(57) ABSTRACT

A method that may be performed by a UE includes obtaining map information regarding, at least, one or more reflectors in an environment including at least the UE and another node, detecting at least one positioning reference signal (PRS) transmission that travels one or more non line-of-sight (NLOS) transmission paths in the environment, and participating in a positioning procedure that estimates a position of the UE based, at least in part, on the at least one PRS transmission that travels the one or more NLOS transmission paths and the map information.

24 Claims, 11 Drawing Sheets

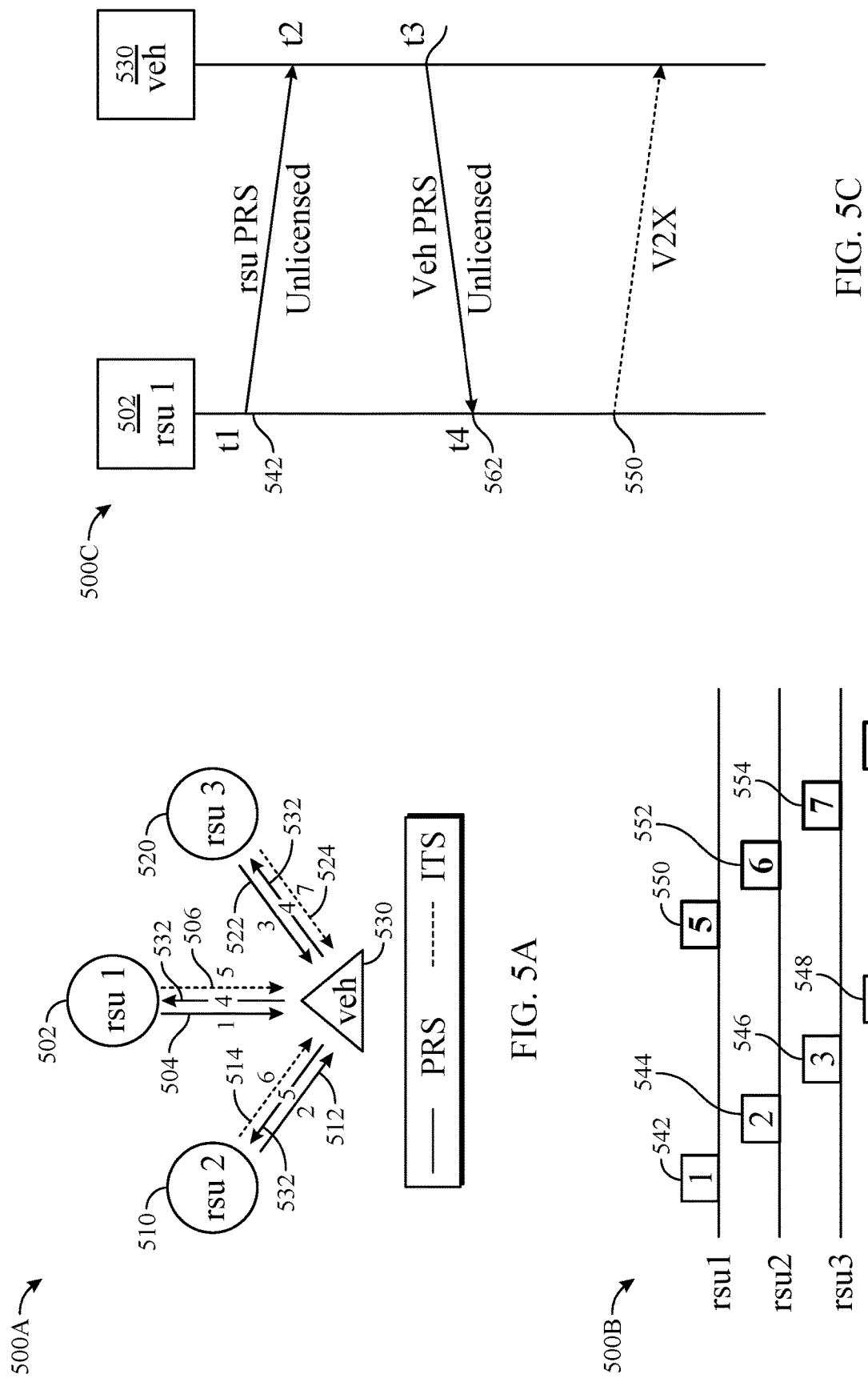

APPROACH TO USE POSITIONING
REFERENCE SIGNAL(S) (PRS(S))
TRAVELING NON LINE-OF-SIGHT (NLOS)
TRANSMISSION PATHS AND MAP
INFORMATION FOR POSITIONING OF
USER EQUIPMENTS (UES)

CROSS-REFERENCE TO RELATED
APPLICATION(S)

This application claims benefit of and priority to U.S. Provisional Application No. 63/074,984 filed Sep. 4, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for improving positioning accuracy of user equipments (UEs) using positioning reference signal (PRS) transmissions traveling one or more non line-of-sight (NLOS) transmission paths and map information.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (NR) (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved accuracy in positioning of user equipments (UEs) (e.g., UEs in vehicles).

Certain aspects of the subject matter described in this disclosure can be implemented in a method for wireless communication performed by a UE. The method generally includes obtaining map information and participating in a positioning procedure that estimates a position of the UE based on the map information and at least one non line of sight (NLOS) positioning reference signal (PRS) transmission that travels an NLOS path between the UE and another node.

Certain aspects of the subject matter described in this disclosure can be implemented in a method for wireless communication performed by a UE. The method generally includes obtaining map information regarding, at least, one or more reflectors in an environment including at least the UE and another node; detecting at least one PRS transmission that travels one or more NLOS transmission paths in the environment; and participating in a positioning procedure that estimates a position of the UE based, at least in part, on the at least one PRS transmission that travels the one or more NLOS transmission paths and the map information.

Certain aspects of the subject matter described in this disclosure can be implemented in a method for wireless communication performed by a node (e.g., a wireless node). The method generally includes obtaining an indication that a UE has map information and participating in a positioning procedure that estimates a position of the UE based on the map information and at least one NLOS PRS transmission that travels an NLOS path between the UE and the node.

Certain aspects of the subject matter described in this disclosure can be implemented in a method for wireless communication performed by a node (e.g., a wireless node). The method generally includes obtaining an indication that map information regarding, at least, one or more reflectors in an environment including at least a UE and the node is available to the UE; and participating in a positioning procedure that estimates a position of the UE based, at least in part, on at least one PRS transmission that travels one or more NLOS transmission paths and the map information.

Certain aspects of the subject matter described in this disclosure can be implemented in an apparatus for wireless communications. The apparatus generally includes memory, a transceiver, and at least one processor communicatively coupled to the memory and the transceiver, the at least one processor configured to: obtain map information; and participate in a positioning procedure that estimates a position of the apparatus based on the map information and at least one NLOS PRS transmission that travels an NLOS path between the apparatus and another node.

Certain aspects of the subject matter described in this disclosure can be implemented in an apparatus for wireless communications. The apparatus generally includes memory, a transceiver, and at least one processor communicatively coupled to the memory and the transceiver, the at least one processor configured to: obtain map information regarding, at least, one or more reflectors in an environment including at least the apparatus and another node; detect at least one PRS transmission that travels one or more NLOS transmission paths in the environment; and participate in a positioning procedure that estimates a position of the apparatus based, at least in part, on the at least one PRS transmission that travels the one or more NLOS transmission paths and the map information.

Certain aspects of the subject matter described in this disclosure can be implemented in an apparatus for wireless communications. The apparatus generally includes memory, a transceiver, and at least one processor communicatively coupled to the memory and the transceiver, the at least one processor configured to: obtain an indication that a UE has map information; and participate in a positioning procedure that estimates a position of the UE based on the map information and at least one NLOS PRS transmission that travels an NLOS path between the UE and the apparatus.

Certain aspects of the subject matter described in this disclosure can be implemented in an apparatus for wireless communications. The apparatus generally includes memory, a transceiver, and at least one processor communicatively coupled to the memory and the transceiver, the at least one processor configured to: obtain an indication that map information regarding, at least, one or more reflectors in an environment including at least a UE and the apparatus is available to the UE; and participate in a positioning procedure that estimates a position of the UE based, at least in part, on at least one PRS transmission that travels one or more NLOS transmission paths and the map information.

Certain aspects of the subject matter described in this disclosure can be implemented in an apparatus for wireless communications performed by a UE. The apparatus generally includes: means for obtaining map information; and means for participating in a positioning procedure that estimates a position of the UE based on the map information and at least one NLOS PRS transmission that travels an NLOS path between the UE and another node.

Certain aspects of the subject matter described in this disclosure can be implemented in an apparatus for wireless communications performed by a UE. The apparatus generally includes: means for obtaining map information regarding, at least, one or more reflectors in an environment including at least the UE and another node; means for detecting at least one PRS transmission that travels one or more NLOS transmission paths in the environment; and means for participating in a positioning procedure that estimates a position of the UE based, at least in part, on the at least one PRS transmission that travels the one or more NLOS transmission paths and the map information.

Certain aspects of the subject matter described in this disclosure can be implemented in an apparatus for wireless communications performed by a node (e.g., a wireless node). The apparatus generally includes: means for obtaining an indication that a UE has map information; and means for participating in a positioning procedure that estimates a position of the UE based on the map information and at least one NLOS PRS transmission that travels an NLOS path between the UE and the node.

Certain aspects of the subject matter described in this disclosure can be implemented in an apparatus for wireless communications performed by a node (e.g., a wireless node). The apparatus generally includes: means for obtaining an indication that map information regarding, at least, one or more reflectors in an environment including at least a UE and the node is available to the UE; and means for participating in a positioning procedure that estimates a position of the UE based, at least in part, on at least one PRS transmission that travels one or more NLOS transmission paths and the map information.

Certain aspects of the subject matter described in this disclosure can be implemented in a computer-readable medium for wireless communications including instructions that, when executed by a processing system in a UE, cause the processing system to perform operations including: obtaining map information; and participating in a positioning procedure that estimates a position of the UE based on the map information and at least one NLOS PRS transmission that travels an NLOS path between the UE and another node.

Certain aspects of the subject matter described in this disclosure can be implemented in a computer-readable medium for wireless communications including instructions that, when executed by a processing system in a UE, cause the processing system to perform operations including: obtaining map information regarding, at least, one or more reflectors in an environment including at least the UE and another node; detecting at least one PRS transmission that travels one or more NLOS transmission paths in the environment; and participating in a positioning procedure that estimates a position of the UE based, at least in part, on the at least one PRS transmission that travels the one or more NLOS transmission paths and the map information.

Certain aspects of the subject matter described in this disclosure can be implemented in a computer-readable medium for wireless communications including instructions that, when executed by a processing system in a node (e.g., wireless node), cause the processing system to perform operations including: obtaining an indication that a UE has map information; and participating in a positioning procedure that estimates a position of the UE based on the map information and at least one NLOS PRS transmission that travels an NLOS path between the UE and the node Certain aspects of the subject matter described in this disclosure can be implemented in a computer-readable medium for wireless communications including instructions that, when executed by a processing system in a node (e.g., wireless node), cause the processing system to perform operations including: obtaining an indication that map information regarding, at least, one or more reflectors in an environment including at least a UE and the node is available to the UE; and participating in a positioning procedure that estimates a position of the UE based, at least in part, on at least one PRS transmission that travels one or more NLOS transmission paths and the map information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

FIGS. 5A-C are schematic illustrations of roadside service units (RSUs) and a vehicle performing sidelink positioning, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
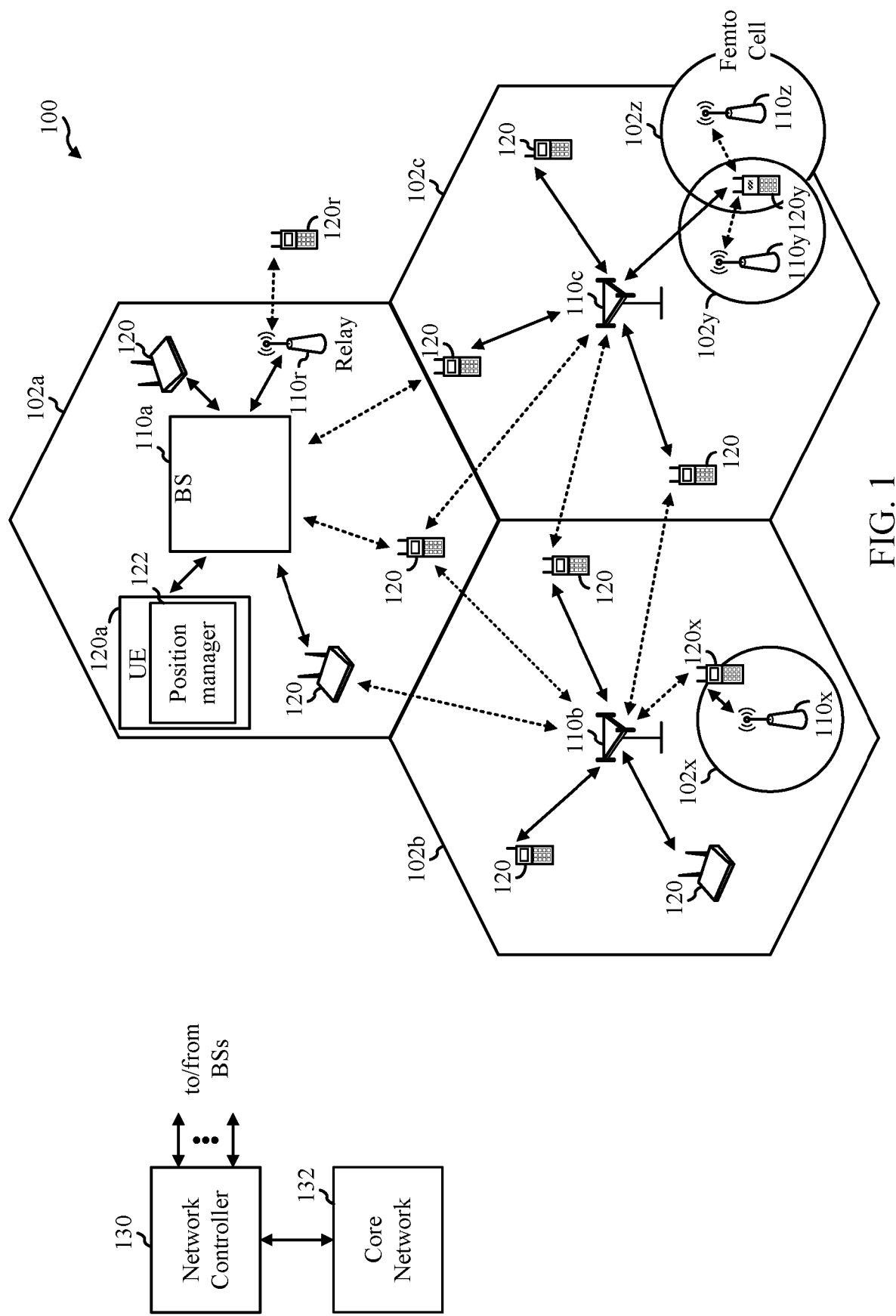
FIG. 1 is a block diagram conceptually illustrating an example wireless communication network, in accordance with certain aspects of the present disclosure.

Aspects of the present disclosure relate to wireless communications, and more particularly, to techniques for improving sidelink positioning accuracy by using map information and at least one positioning reference signal (PRS) transmission traveling one or more non line-of-sight (NLOS) transmission paths in an environment including, at least, a source transmitting the PRS transmission and a receiver receiving the PRS transmission to participate in a positioning procedure. As used herein, NLOS paths describe indirect paths between the source and the receiver, or paths between the source and the receiver involving obstacles or obstructions. Map information described herein may include information about reflectors, objects, or obstructions in the environment.

Conventional PRS-based positioning algorithms may be challenged by using PRS measurement information from PRS transmission(s) traveling one or more NLOS transmission paths (e.g., which are caused by blocking or reflections); thus, conventional PRS-based positioning algorithms are generally designed to discard such PRS measurement information related to these transmissions (without extracting useful information prior to removal) and instead only use PRS measurement information for PRS transmissions traveling a line-of-sight (LOS) transmission path (e.g., a direct path between the source and receiver, without any obstacles or obstructions). However, detecting which PRS transmission(s) are traveling NLOS transmission paths so that they may be discarded requires a sufficient number of PRS transmissions traveling LOS transmission paths for accurate detection. Where the number of PRS transmissions traveling LOS transmission paths is insufficient, the algorithm may not work to discard such PRS transmissions traveling NLOS paths thereby affecting the accuracy of positioning estimation. As opposed to discarding PRS transmissions traveling NLOS paths, aspects described herein may utilize such PRS transmissions to enhance positioning.

The following description provides examples of improving positioning accuracy for UEs and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 24 gigahertz (GHz) to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications Network

FIG. 1 illustrates an example wireless communication network 100 in which aspects of the present disclosure may be performed. The wireless communication network 100 may include one or more user equipments (UEs) and one or more base stations (BSs). As shown in FIG. 1 UE 120a includes position manager 122 configured to perform operations 600 of FIG. 6 and/or operations 700 of FIG. 7.

The wireless communication network 100 may be a new radio (NR) system (e.g., a 5G NR network). As shown in FIG. 1, the wireless communication network 100 may be in communication with a core network 132. The core network 132 may in communication with one or more BSs 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be in communication with a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 RBs), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplexing (TDD). Beamforming may be supported and beam direction may be dynamically configured. Multiple-input-multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 20 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or UL. A finely dashed line with double arrows indicates interfering transmissions between a UE 120 and a BS 110.

In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
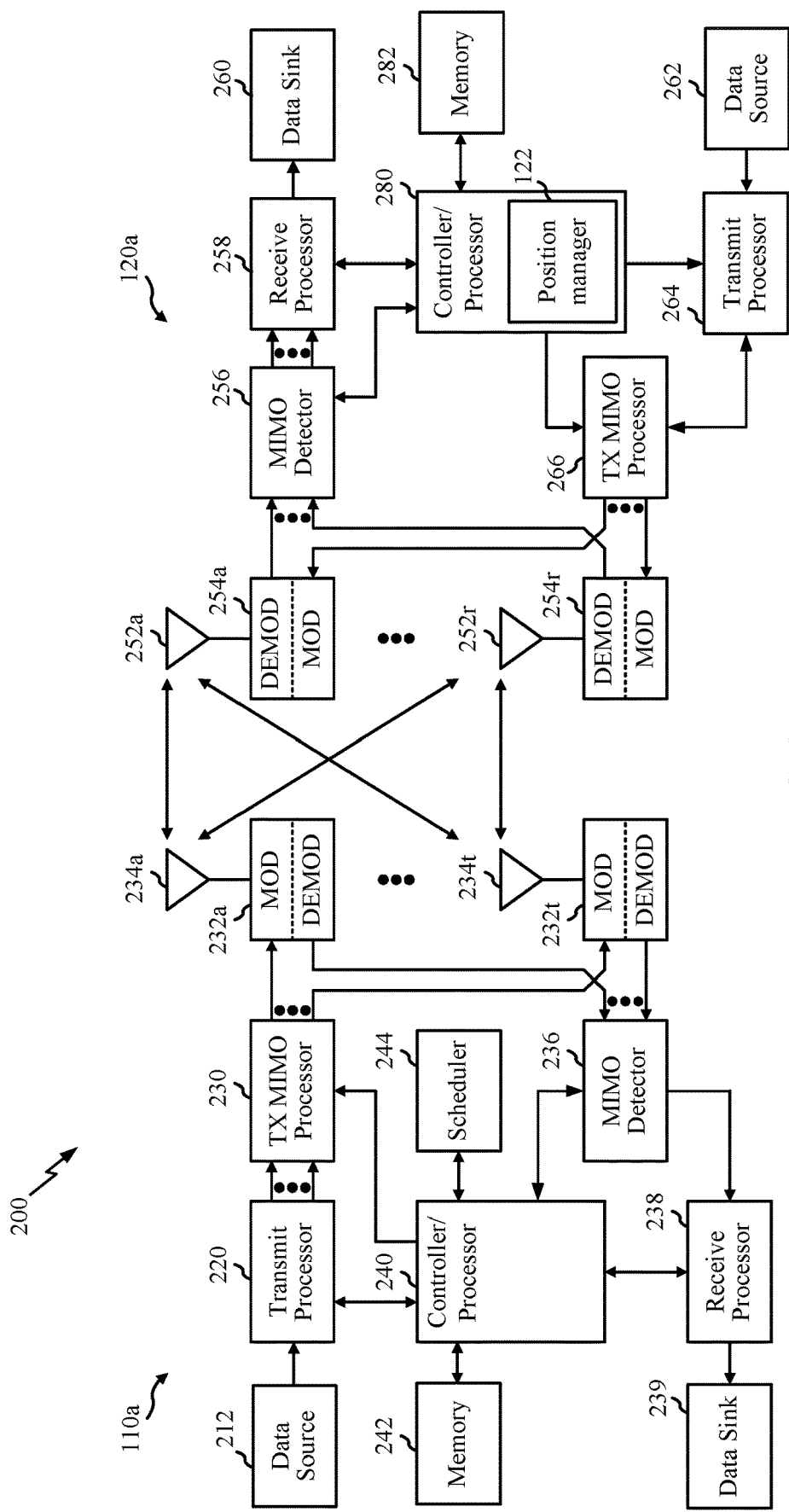
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure. For example, antennas 252, processors 266, 258, 264, and/or controller/processor 280 of the UE 120*a* may be used to perform the various techniques and methods described herein. For example, as shown, the controller/processor 280 of the UE 120*a* may include a position manager 122 configured to perform (or cause UE 120*a* to perform) operations 600 of FIG. 6 and/or operations 700 of FIG. 7.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 232*a*-232*t* may be transmitted via the antennas 234*a*-234*t*, respectively.

At the UE 120*a*, the antennas 252*a*-252*r* may receive the DL signals from the BS 110*a* and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

NR may utilize OFDM with a CP on the UL and DL. NR may support half-duplex operation using TDD. OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
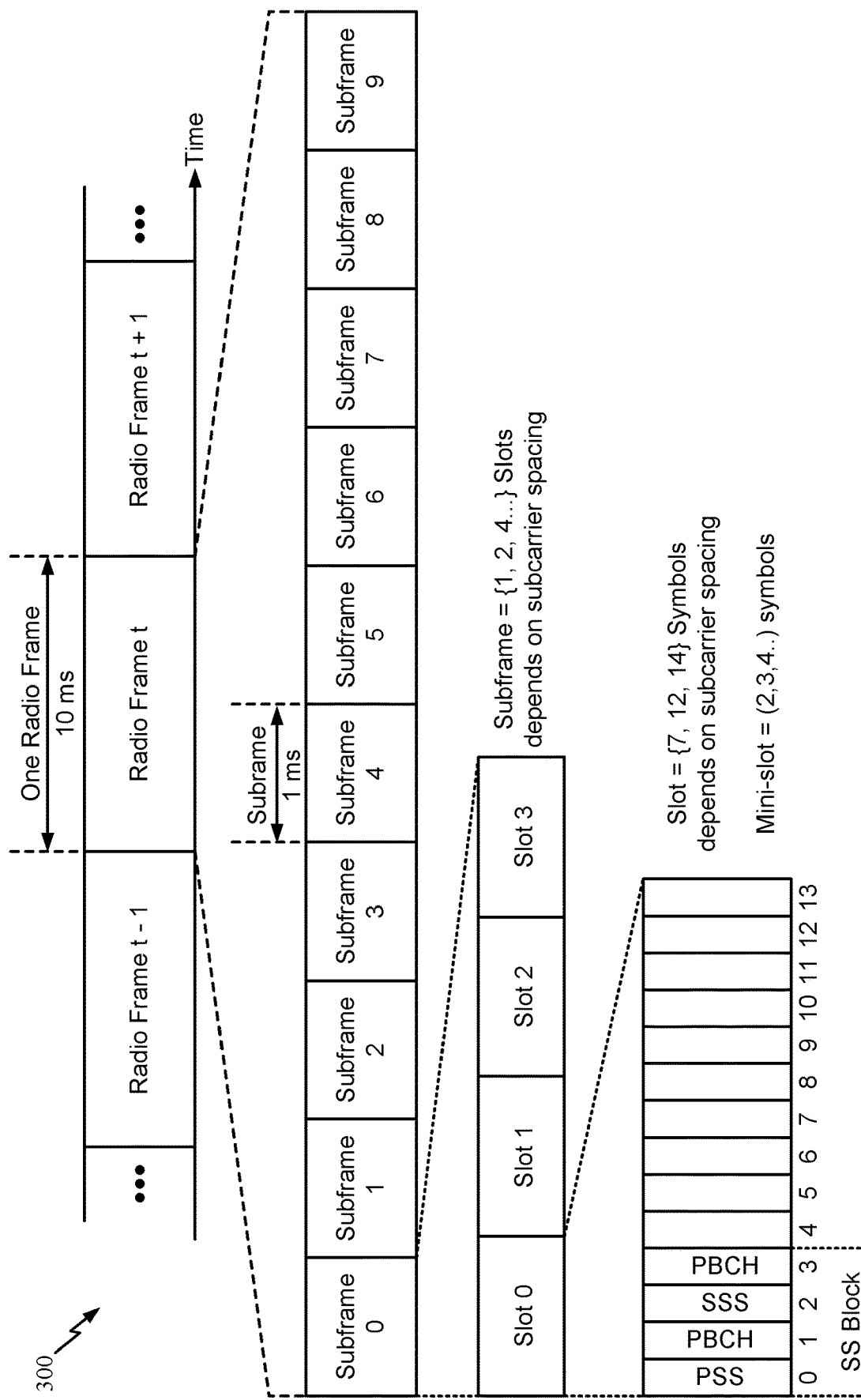
FIG. 3 is an example frame format for certain wireless communication systems (e.g., new radio (NR)), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for millimeter wave (mmW). The multiple transmissions of the SSB are referred to as an SS burst set. SSBs in an SS burst set may be transmitted in the same frequency region, while SSBs in different SS bursts sets may be transmitted at different frequency regions.

Figure 4B:
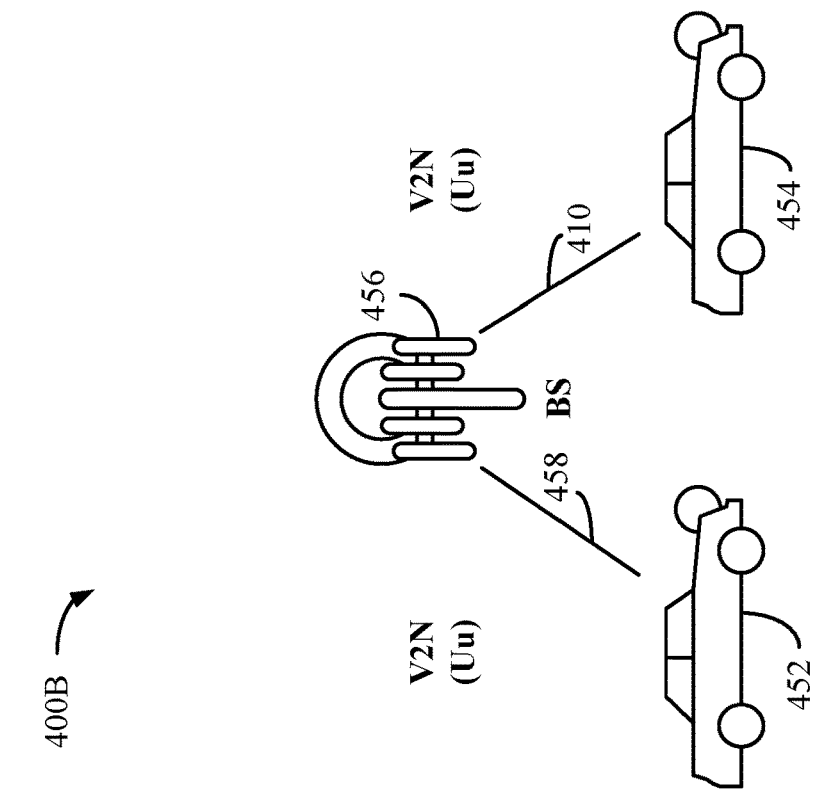
FIG. 4A and FIG. 4B show diagrammatic representations of example vehicle to everything (V2X) systems, in accordance with certain aspects of the present disclosure.
Figure 4A:
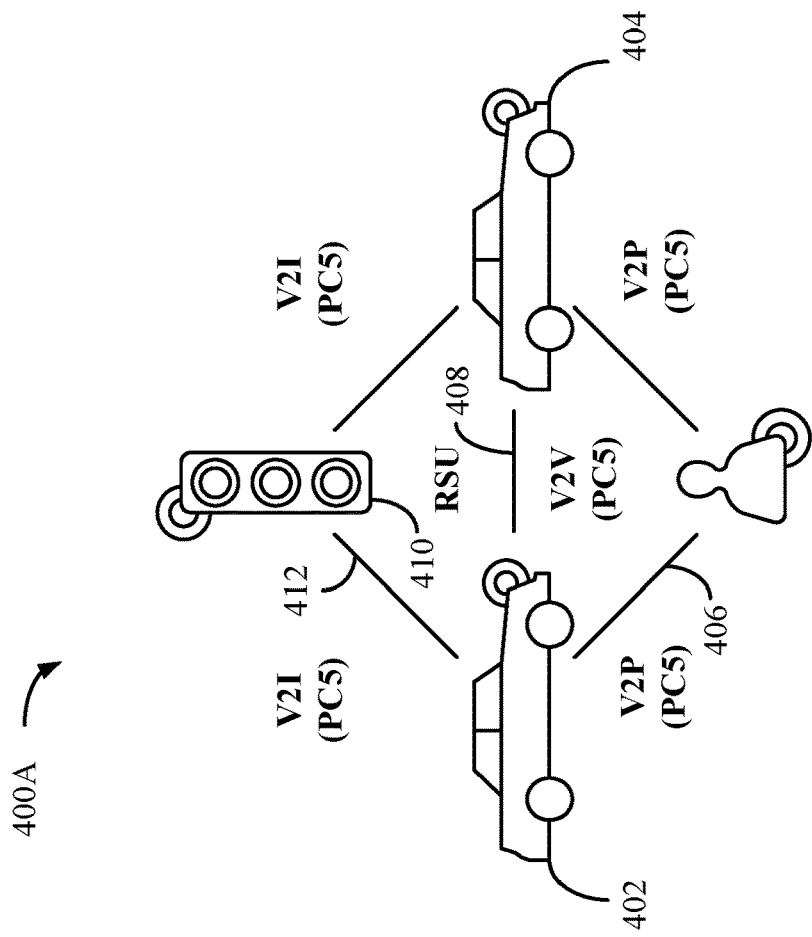

FIGS. 4A and 4B show diagrammatic representations of example vehicle to everything (V2X) systems, in accordance with some aspects of the present disclosure. For example, vehicles 402, 404, 425, 454 shown in FIGS. 4A and 4B, respectively, may communicate via sidelink channels and may perform sidelink CSI reporting, as described herein.

The V2X systems, provided in FIGS. 4A and 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including vehicle to vehicle (V2V) communications) is illustrated with two vehicles 402, 404. The first transmission mode allows for direct communication between different participants in a given geographic location. As illustrated, vehicle 402 has a wireless communication link 406 with an individual (e.g., in vehicle to pedestrian (V2P) communications) (for example, via a UE) through a PC5 interface. Communications between vehicles 402 and 404 may also occur through a PC5 interface 408. In a like manner, communication may occur from a vehicle 402 to other highway components (for example, roadside service unit (RSU) 410), such as a traffic signal or sign (e.g., in vehicle to infrastructure (V2I) communications) through a PC5 interface 412. With respect to each communication link illustrated in FIG. 4A, two-way communication may take place between elements, therefore each element may be a transmitter and a receiver of information. V2X system 400A may be a self-managed system implemented without assistance from a network entity. A self-managed system may enable improved spectral efficiency, reduced cost, and increased reliability as network service interruptions do not occur during handover (HO) operations for moving vehicles. V2X system 400A may be configured to operate in a licensed or unlicensed spectrum, thus any vehicle with an equipped system may access a common frequency and share information. Such harmonized/common spectrum operations allow for safe and reliable operation.

FIG. 4B shows a V2X system 400B for communication between a vehicle 452 and another vehicle 454 through a wireless node 456 (e.g. network entity). These network communications may occur through discrete nodes, such as a BS (e.g., BS 110a in the wireless communication network 100 of FIG. 1), that sends and receives information to and from (for example, relays information between) vehicles 452, 454. The network communications through vehicle to network (V2N) links 458 (e.g., between vehicle 452 and wireless node 456) and 410 (e.g., between vehicle 454 and wireless node 456) may be used, for example, for long range communications between vehicles 452, 454, such as for communicating the presence of a car accident a distance ahead along a road or highway. Other types of communications may be sent by wireless node 456 to vehicles 452, 454, such as traffic flow conditions, road hazard warnings, environmental/weather reports, and service station availability, among other examples. Such data can be obtained from cloud-based sharing services.

RSUs may also be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcast critical information received from some UEs. UE-type RSUs may be a reliable synchronization source.

Aspects of the disclosure relate to sidelink communications, such as cellular-V2X (C-V2X) communications. C-V2X can offer vehicles low-latency V2V, V2I, and V2P communication. C-V2X networks can operate without cellular infrastructure support. For example, C-V2X communication allows direct communication between two UE devices, without transmissions through a BS, functioning by continuous monitoring and decoding of other UE devices. In C-V2X, vehicles can autonomously select their radio resources. For example, the vehicles may select resources, such as semi-persistent scheduling (SPS) resources, according to an algorithm. The algorithm may be a resource allocation algorithm specified by the 3GPP wireless standards.

Current 3GPP C-V2X design targets deployment in a licensed spectrum, either by deployment in a shared, licensed cellular band or by deployment in a dedicated intelligent transportation system (ITS) spectrum. In the licensed spectrum, the spectrum may be assigned exclusively to operators for independent usage. Licensed spectrums may either be shared or dedicated. Shared licensed spectrums provide bandwidth up to a specified level and the bandwidth is shared among all subscribers. Therefore, in a licensed cellular band, a C-V2X system shares UL spectrum in the cellular network. On the other hand, dedicated internet spectrum provides guaranteed bandwidth at all times, thereby providing spectrum exclusivity when the C-V2X design is deployed in a dedicated ITS spectrum.

ITSs have been developed for decades to support a wide variety of safety-critical and traffic-efficient applications. Under current Federal Communication Commission (FCC) rules, the 5.9 gigahertz (GHz) band is reserved for dedicated short-range communication (DSRC), which facilitates both V2V and V2I communications.

Other countries and regions have also allocated spectrums around 5.9 GHz to V2X communications; however, dedicated spectrums may not be guaranteed in all locations due to spectrum scarcity. Spectrum scarcity has emerged as a primary problem encountered when trying to launch new wireless services in some regions. The effects of this scarcity have led some locations to allocate spectrums for LTE V2X only, leaving allocated spectrum unavailable for NR V2X. 3GPP Release 16 (Rel-16) includes specification for 5G NR C-V2X which targets advanced V2X use cases, such as autonomous driving. Rel-16 5G NR C-V2X goes beyond technology that targets basic safety, by adding direct multicast communication technology for advanced safety, increased situational awareness, energy savings, and faster travel time.

In some cases, deployment of C-V2X communications involves deployment in an unlicensed spectrum. Unlicensed spectrum refers to radio frequency bands in which technical rules are specified for both the hardware and deployment methods of radio systems such that the band is open for shared use by an unlimited number of unaffiliated users. In an unlicensed spectrum, the spectrum may be available for non-exclusive usage subject to some regulatory constraints (e.g., restrictions in transmission power).

In an unlicensed spectrum, a minimum channel bandwidth may be specified in accordance with regional regulations, and any technological device may transmit in a bandwidth greater than the specified minimum channel bandwidth. For example, in some regions the minimum channel bandwidth may be set at 5 megahertz (MHz). There exists a wide range of unlicensed spectrums available from 5 GHz to 6 GHz (e.g., Unlicensed National Information Instructure 3 (U-NII-3) operating between 5.725 GHz and 5.850 GHz or U-NII-4 operating between 5.850 GHz and 5.925 GHz). As used herein, the 5 GHz unlicensed spectrum, also referred to as the U-NII band, comprises the frequency range between 5,150 MHz and 5,925 MHz. The 6 GHz unlicensed spectrum potentially comprises the frequency range from 5,925 MHz up to 7,125 MHz.

In contrast with most licensed assignments of spectrum use rights, devices or systems operating on an unlicensed basis enjoy no regulatory protection against interference from other licensed or unlicensed users in the band. Currently, the unlicensed spectrum may be utilized by Wireless Local Area Networks (WLANs), such as the ones that are based on Institute of Electrical and Electronics Engineers (IEEE) 801.11a/g/n/ac technologies, which are also referred to as Wi-Fi systems. For example, a Wi-Fi device may transmit, for example, in a channel bandwidth of 20 MHz, 80 MHz, 160 MHz, or any other channel bandwidth above 5 MHz.

C-V2X communications deployed in an unlicensed spectrum may operate in either a distributed or a centralized manner. In distributed C-V2X, UEs communicate independently without the assistance of a central node (e.g., a BS) scheduling transmissions between the UEs. In centralized C-V2X, a central node controls and assists with sidelink communications.

Although continuous monitoring may help to effectuate sidelink communication, UEs in an unlicensed spectrum may be incapable of meeting these demands. Continuous monitoring of all carriers/frequencies for potential sidelink transmission may be an unrealistic expectation when a UE is deployed in an unlicensed spectrum due to the wide range of available spectrums (e.g., U-NII-3 or U-NII-4) in the unlicensed band coupled with the band's limited capability.

Accordingly, capability of the UE to transmit and receive in a limited number of carriers (e.g., frequencies) known to all UEs is beneficial to reduce the UE's burden of monitoring all carriers within in an unlicensed band. For example, this burden may be alleviated where UEs have common understanding of carrier(s) used for C-V2X communication. However, statically limiting C-V2X communication to a specific unlicensed carrier may lead to sub-optimal performance, such as an increased probability of interference with other technologies within the band (other technologies may access the unlicensed spectrum as long as they comply with regulatory requirements).

Example Sidelink Positioning

According to aspects of the present disclosure, sidelink positioning may include transmitting, receiving, and measuring positioning reference signals (PRSs) to and from two or more roadside service units (RSUs) and a vehicle.

In aspects of the present disclosure, sidelink positioning may further include roundtrip time (RTT) based positioning using PRSs on an unlicensed spectrum.

According to aspects of the present disclosure, using intelligent transportation system (ITS) messaging in the vehicle to everything (V2X) spectrum, RSUs and a vehicle may be grouped. The RSUs and the vehicle in the group may perform group listen before talk (LBT), wherein an initiator (e.g., one of the RSUs) reserves time slots for PRS transmissions by members of the group. For example, an initiator RSU may perform a category 4 (CAT 4) LBT (with random backoff) to reserve the channel occupancy time (CoT) for its group members, while a responder may perform a category 2 (CAT 2) LBT without backoff.

In aspects of the present disclosure, PRSs may be broadcast sequentially, with each RSU in the group transmitting a PRS, and then the vehicle transmitting a PRS. The time of arrival (ToA) of PRSs may then be exchanged using ITS messaging in V2X spectrum.

According to aspects of the present disclosure, a vehicle may estimate a location of the vehicle and clock error (e.g., inaccuracy in a satellite clock, e.g., due to drift of the satellite, that affects position calculated by a receiver), based on the ToA and using, for example, a Kalman filter.

FIGS. 5A-C are timelines 500A, 500B, and 500C of RSUs 502, 510, and 520 and vehicle 530 performing sidelink positioning, in accordance with certain aspects of the present disclosure. FIG. 5B schematically illustrates timeline 500B of the various transmissions. FIG. 5C schematically illustrates timeline 500C of transmissions between RSU 502 and vehicle 530.

As illustrated in FIG. 5A, RSU 502 transmits a first PRS 504 at a time 542 (see FIG. 5B). RSU 510 transmits a second PRS 512 at time 544. Similarly, RSU 520 transmits a third PRS 522 at time 546. A vehicle 530 transmits a fourth PRS 532 (which is received by each of RSU 502, 510, and 520) at time 548. RSU 502 transmits a first ITS message 506 at time 550 that indicates the time 542 at which the RSU 502 transmitted the PRS 504 and the time 562 (see FIG. 5C) when the RSU 502 received the fourth PRS 532 from vehicle 530. Similarly, RSU 510 transmits a second ITS message 514 at time 552 that indicates the time at which RSU 510 transmitted the second PRS 512 and the time at which the RSU 510 received the fourth PRS 532 from vehicle 530. RSU 520 transmits a third ITS message 524 at time 554 that indicates the time at which RSU 520 transmitted the third PRS 522 and the time at which RSU 520 received the fourth PRS 532 from vehicle 530. As mentioned above, each of the time slots 542, 544, 546, 548, 550, 552, and 554 may have been reserved via a group LBT process.

Given the example shown in FIG. 5C, the RTT for PRS exchanged between RSU 502 and vehicle 530 may be expressed as:

$$z_n = (t_4 - t_3) + (t_2 - t_1) = \frac{\|r - x(t_n)\|}{v_{light}} + \alpha$$

where:

| | |
|---|---|
| z | round trip time (RTT) between the vehicle and the RSU; |
| $t_4$ | time (reported by the RSU) that the RSU receives a PRS from the vehicle; |
| $t_3$ | time (per the vehicle clock) that the vehicle transmitted a PRS; |
| $t_2$ | time (per the vehicle clock) that the vehicle received a PRS from the RSU; |
| $t_1$ | time (reported by the RSU) that the RSU transmitted a PRS; |
| r | location of the RSU; |
| $x(t_n)$ | estimate of position of the vehicle at time t; |
| $v_{light}$ | the speed of light, also referred to as c |
| α | clock error |

From this RTT value and the relationship between each RSU 502, 510, 520 and vehicle 530 above, and assuming the PRS transmissions between each RSU 502, 510, 520 and vehicle 530 are PRS transmissions traveling one or more line of sight (LOS) paths, the distance between any given RSU 502, 510, 520 and vehicle 530 (e.g., vehicle UE (V-UE)) can be determined. As used herein, LOS paths describe direct paths between a source transmitting the signal (in this case, the PRS) and a receiver receiving the signal, e.g., without any obstacles or obstructions.

Given similar calculations for multiple RSUs at known (fixed) locations, vehicle 530 (e.g., V-UE) may be able to determine its own location. For example, in some cases, vehicle 530 may use Sidelink based (SL-b) positioning to compute its own location. In some other cases, vehicle 530 may use sidelink-assisted (SL-a) positioning to determine its own location by having RSUs or servers compute the location of vehicle 530 on its behalf. SL-a and SL-b positioning may be described in more detail below.

Example Positioning Using Map Information and Positioning Reference Signal(s) (PRS(s)) Traveling Non Line-of-Sight (NLOS) Paths Aspects of the present disclosure provide techniques for improving sidelink positioning accuracy by using map information and at least one positioning reference signal (PRS) transmission traveling one or more non line-of-sight (NLOS) transmission paths in an environment including, at least, a source transmitting the PRS transmission and a receiver receiving the PRS to participate in a positioning procedure. As used herein, NLOS transmission paths describe indirect paths between the source and the receiver, or paths between the source and the receiver involving obstacles or obstructions. Map information described herein may include information about reflectors, objects, or obstructions in the environment. For example, reflectors may include buildings a PRS transmission may reflect off of in an NLOS path between a source transmitting the PRS transmission and the receiver of the PRS transmission (e.g., target of the PRS transmission).

As described above with reference to FIGS. 5A-5C, sidelink positioning may involve PRSs broadcast from RSUs and vehicular UEs (V-UEs) (also referred to herein as vehicles) (e.g., in an unlicensed spectrum), as well as PRS measurements broadcast from RSUs and V-UEs (e.g., in an intelligent transportation system (ITS) spectrum). In cases where Sidelink based (SL-b) positioning is used, a vehicle (e.g., V-UE) may compute/estimate its own location (e.g., in a distributed manner). Thus, in SL-b positioning, PRS measurement information may be intended for a V-UE thereby enabling the V-UE to determine its own location. Alternatively, in cases where Sidelink assisted (SL-a) positioning is used, roadside service units (RSUs) or servers may compute the location of the V-UE on its behalf. Thus, in SL-a positioning, PRS measurement information may be intended for RSUs thereby enabling RSUs to determine the V-UE's location.

PRS measurement messages may include various information, where the information depends on what type of entity is the intended recipient of the PRS measurement information. For example, PRS measurement information intended for vehicles (e.g., for SL-b positioning) may include time of RSU PRS departure(s) and time of vehicle PRS arrival(s). Alternatively, PRS measurement information intended for RSU(s) (e.g., for SL-a positioning) may include time of RSU PRS arrival and time of vehicle PRS departure. For SL-b and SL-a applications, the PRS measurement message may also include various other information, such as a UE identifier (ID), a sequence ID, a location of a UE at the time of PRS broadcast, a measured clock error noise standard deviation (SL-a, SL-b), speed of vehicles (SL-a), and/or a clock drift standard deviation.

As mentioned previously, where the PRS transmission travels in a direct path between the source transmitting the PRS transmission and the receiver receiving the PRS transmission, the path traveled by the PRS transmission may be referred to as an LOS transmission path. In some cases, the LOS transmission path may be a path having no obstacles. When the PRS travels an LOS transmission path, the wave travel distance (time of arrival-time of departure) coincides with the actual range. In practice, however, typically obstacles exist in the path of the PRS transmission from the source transmitting the PRS transmission and the receiver receiving the PRS transmission. Such obstacles may create reflections and/or blockage, thereby leading to multipath PRS transmission, and more specifically, PRS transmission where the PRS travels one or more NLOS paths.

Conventional PRS-based positioning algorithms may be challenged by using PRS measurement information from PRS transmission(s) (from RSUs or vehicles) traveling one or more NLOS transmission paths (e.g., which are caused by blocking or reflections). For example, at the receiver UE-side, due to the longer travel time of PRS transmissions along NLOS transmission paths, NLOS samples (e.g., PRS measurement information for PRS transmissions along NLOS transmission paths) may provide inaccurate ranging, thus the corresponding increase in RTT may give a positive value bias to the ranging.

Conventional approaches for addressing issues with the use of NLOS samples in estimating a position of a UE may use an algorithm or data-based neural network to identify and remove such NLOS samples, such that only LOS samples (e.g., PRS measurement information for PRS transmission along LOS transmission paths) are used in estimating a position of the UE. Unfortunately, this detection of NLOS samples (e.g., for removal) may only work if there are substantially more LOS samples than NLOS samples (LOS samples>>NLOS samples). In other words, statistical dominance (e.g., LOS dominance) may be important to ensure the successful detection and removal of PRS measurement information related to PRS transmission along NLOS transmission paths. In addition, generally NLOS detection algorithms are designed to remove bad LOS samples, without extracting useful information prior to removal of these samples, thereby reducing the number of LOS samples which may be used to detect NLOS samples. Accordingly, LOS dominance mat not be met, and conventional NLOS detection algorithms may not work.

Aspects of the present disclosure present techniques for using map information to identify PRS transmissions traveling NLOS paths and further using the identified PRS transmissions traveling NLOS paths, in addition to the map information, to estimate a position of a UE in sidelink communication. As opposed to discarding PRS transmissions traveling NLOS transmission paths, aspects described herein may utilize such PRS transmissions to enhance positioning.

Figure 6:
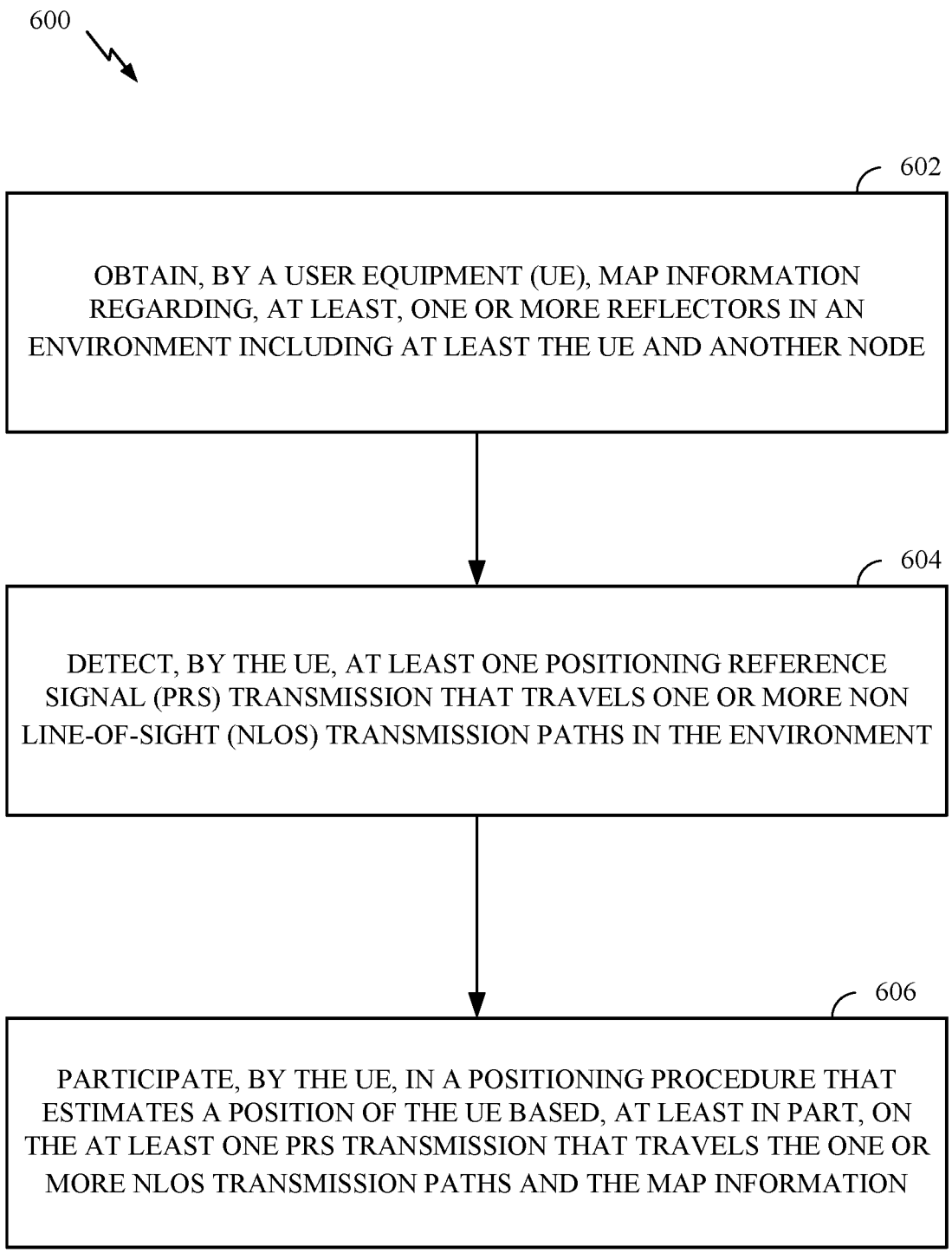
FIG. 6 is a flow diagram illustrating example operations for wireless communication by a UE, in accordance with certain aspects of the present disclosure.

FIG. 6 is a flow diagram illustrating example operations 600 for wireless communication by a UE, in accordance with certain aspects of the present disclosure. For example, operations 600 may be performed by UE 120a in wireless communication network 100 of FIG. 1. The UE performing operations 600 may be a V-UE or a pedestrian UE participating in a positioning procedure that takes advantage of map information to extract useful information from PRS transmissions identified as PRS transmissions traveling NLOS transmission paths.

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 begin, at block 602, by a UE obtaining map information regarding, at least, one or more reflectors in an environment including at least the UE and another node (e.g., a wireless node, such as another UE (pedestrian or vehicle) or an RSU). For example, the map information may include high definition (HD) map information, local map information regarding one or more reflectors/reflector locations and/or one or more obstacles/obstacle locations (e.g. building locations) in the environment, map information trained or learned by the UE, or map information obtained from a server. V-UEs and/or pedestrian UEs may be commonly equipped with such map information and/or equipped to access to such map information.

At block 604, the UE detects at least one PRS transmission that travels one or more NLOS transmission paths in the environment. In some cases, the UE detects at least one PRS transmission that travels one or more NLOS transmission paths in the environment based, at least in part, on the map information. In some other cases, the UE may also detect at least one PRS transmission that travels one or more NLOS transmission paths in the environment based, at least in part, on environment sensing, measured channel impulse response at the UE, observing the temporal evolution of the channel impulse response measurements at the UE, or side information based on the location of the UE.

For example, the measured channel impulse response at the UE may be obtained at the UE by processing a received PRS transmission. The temporal evolution of the channel impulse response may then be observed to determine whether a given path in the observed channel impulse response is due to an LOS path between the transmitter and UE, or due to a NLOS path between the transmitter and the UE. The UE may make such a determination based on receiver algorithms (e.g. by observing Doppler shifts on the estimated paths, or using outlier detection algorithms).

Further, LOS or NLOS classification/determination of observed paths may be improved by providing side information, such as a static map of the environment and/or a map of the environment supplemented with real-time sensing performed at the UE (e.g., using cameras/radar/light detection and ranging (lidar), etc.). In some cases, static map information may be available from application layers at the UE. In some other cases, static information may be provided by a location server or web server. Further side information on location dependent channel impulse response features may be provided by the location server.

In other words, detecting at least one PRS transmission travels one or more NLOS paths in the environment may be determined based on signal processing, for example, by analysis of the signal peaks received and side lobes, early peaks, etc. Or, in the alternative, either the UE or the location server may determine whether a PRS transmission travels one or more NLOS paths (or LOS paths) based on an approximate location determined for the UE, a location of a BS/transmission reception point (TRP), and map data or crowd sourced data of the area around the path between the UE and the B S/TRP.

At block 606, the UE participates in a positioning procedure that estimates a position of the UE based, at least in part, on the at least one PRS transmission that travels the one or more NLOS transmission paths and the map information. As will be described in greater detail below, how the UE participates in the positioning procedure may depend on various factors, such as the type of positioning algorithm (e.g., SL-a or SL-b).

Figure 7:
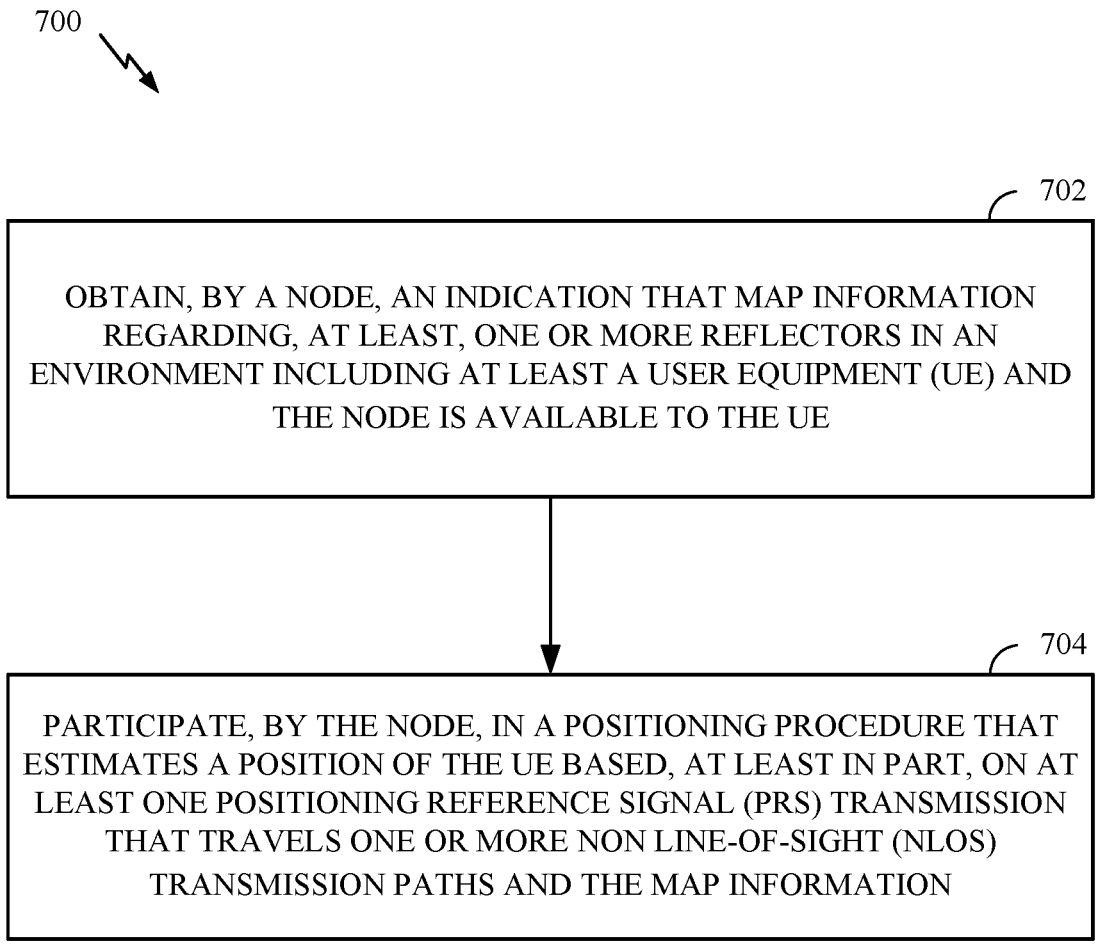
FIG. 7 is a flow diagram illustrating example operations for wireless communication by a wireless node, in accordance with certain aspects of the present disclosure.

FIG. 7 is a flow diagram illustrating example operations 700 for wireless communication be a node, in accordance with certain aspects of the present disclosure. For example, operations 700 may be performed by a wireless node, such as another V-UE, pedestrian UE, or RSU, participating in the positioning procedure to estimate a position of the UE performing operations 600 of FIG. 6. Operations 700 may be considered complementary to operations 600 of FIG. 6.

Operations 700 may be implemented as software components that are executed and run on one or more processors (e.g., controller/processor 280 of FIG. 2). Further, the transmission and reception of signals by the node in operations 700 may be enabled, for example, by one or more antennas (e.g., antennas 252 of FIG. 2). In certain aspects, the transmission and/or reception of signals by the node may be implemented via a bus interface of one or more processors (e.g., controller/processor 280) obtaining and/or outputting signals.

Operations 700 begin, at block 702, by a node obtaining an indication that map information regarding, at least, one or more reflectors in an environment including at least a UE and the node is available to the UE. At block 704, the UE participates in a positioning procedure that estimates a position of the UE based, at least in part, on at least one positioning reference signal (PRS) transmission that travels one or more non line-of-sight (NLOS) transmission paths and the map information.

Figure 8:
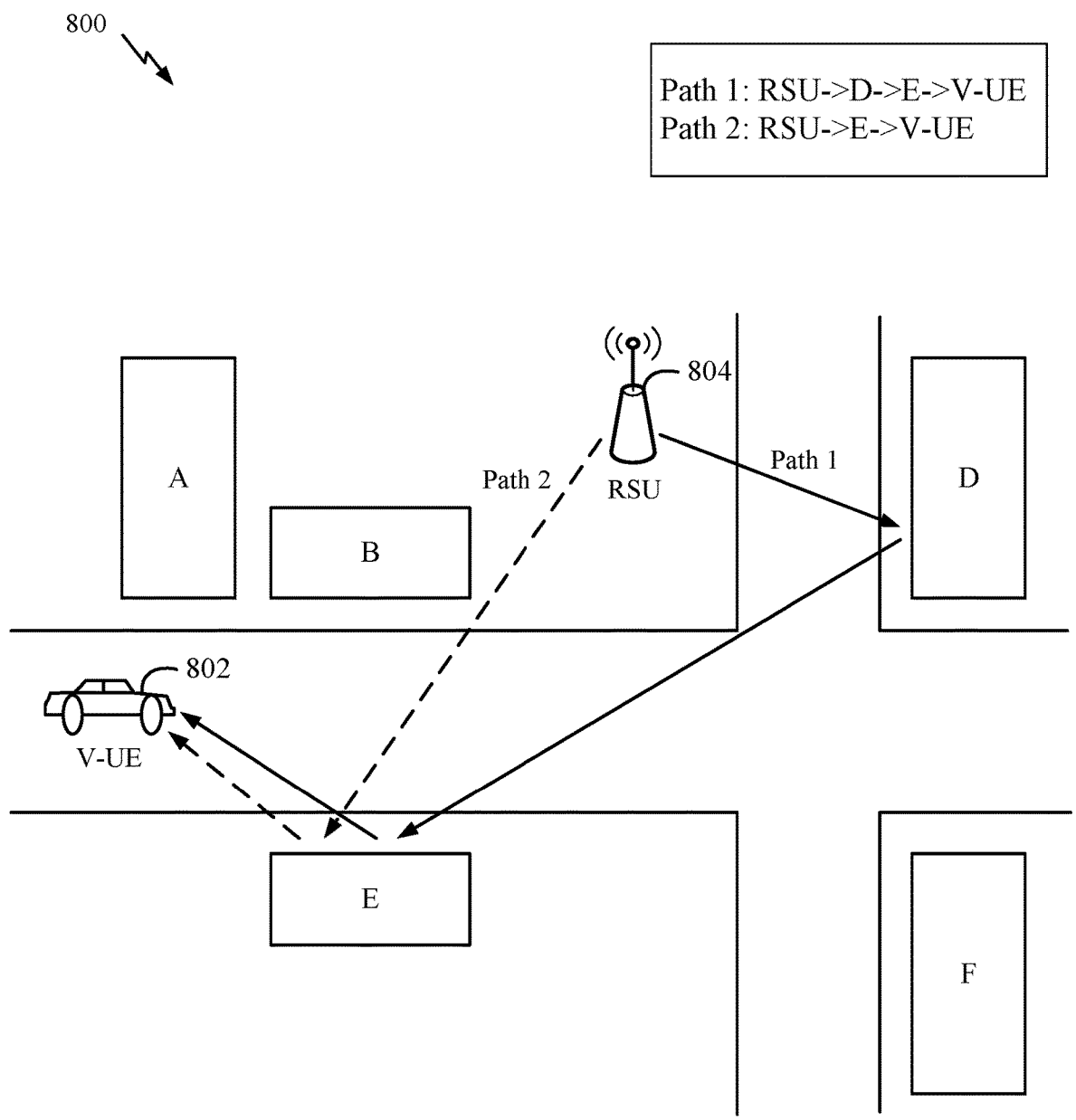
FIGS. 8 and 9 illustrate examples of how positioning reference signal (PRS) transmissions traveling non line-of-sight (NLOS) paths may be exploited for determining a position of a vehicle, in accordance with certain aspects of the present disclosure.
Figure 9:
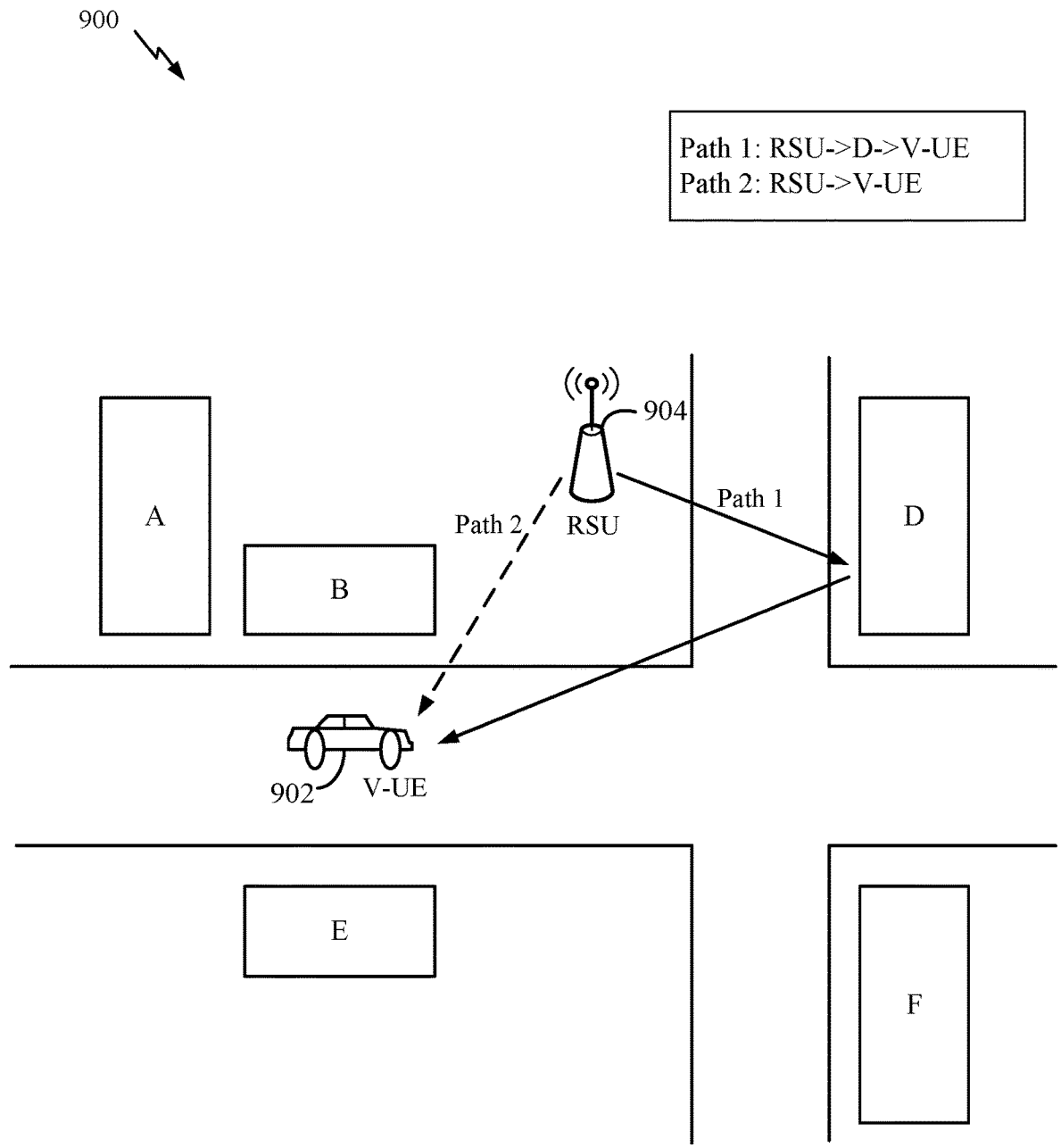

FIGS. 8 and 9 illustrate examples 800 and 900, respectively, of how PRS transmissions traveling NLOS transmission paths may be exploited for determining a position of a vehicle, in accordance with certain aspects of the present disclosure. In examples 800 and 900 of FIGS. 8 and 9, respectively, map information may be used to both distinguish PRS transmissions traveling NLOS transmission paths from PRS transmissions traveling LOS transmission paths and to estimate the position of the vehicle.

In example 800 shown in FIG. 8, algorithms based solely on a PRS transmission traveling one or more LOS transmission paths would not be applicable, as there are no LOS transmission paths available between RSU 804 and V-UE 802. In other words, there are no direct paths, without obstacles or obstructions, between RSU 804 and V-UE 802. Rather, there are two NLOS paths (denoted by Path 1 and Path 2 and FIG. 8). The first NLOS path, Path 1, is from RSU 804 to building D, then from building D to building E, then from building E to V-UE 802 (Path 1: RSU 804→D→E→V-UE 802). The second NLOS path, Path 2, is from RSU 804 to building E, then from building E to V-UE 802 (Path 2: RSU→E→V-UE).

From V-UE 802's perspective, V-UE 802 will receive the same PRS transmission twice: first via the PRS transmission traveling Path 2 (the shorter path) and next via the same PRS transmission traveling Path 1. The corresponding travel time for Path 2 may be computed by subtracting the time of departure of the PRS transmission from RSU 804 from the first time of arrival of the PRS transmission at V-UE 802, via path 2 (First Time of Arrival at V-UE 802—Time of departure from RSU 804). The corresponding travel time for Path 1 may be computed by subtracting the time of departure of the PRS transmission from RSU 804 from the second time of arrival of the same PRS transmission at V-UE 802, via path 1 (Second Time of Arrival at V-UE 802—Time of departure from RSU 804).

Given map information (e.g., that indicates at least the existence/location of buildings D and E), V-UE 802 may be able to detect the PRS transmission traveling path 1 is a PRS transmission traveling an NLOS transmission path and the PRS transmission traveling path 2 is a PRS transmission traveling another NLOS transmission path. Further, V-UE 802 may able to use the map information, in addition to the PRS transmission traveling the first and second NLOS transmission paths in a positioning procedure. This is in contrast to conventional algorithms that simply discard PRS measurement information related to PRS transmissions traveling NLOS transmission paths (although such algorithms, in some cases, may not be able to distinguish the PRS transmission as a PRS transmission traveling an NLOS transmission path, given the lack of LOS transmission paths in this example).

In example 900 shown in FIG. 9, an LOS transmission path between V-UE 902 and RSU 904 is available, unlike example 800 shown in FIG. 8. In particular, the first path, Path 1, is the NLOS transmission path while the second path, Path 2, is the LOS transmission path. The NLOS transmission path, Path 1, is from RSU 904 to building D, then from RSU 904 to V-UE 902 (Path 1: RSU 904→D→V-UE 902). The LOS transmission path, Path 2, is from RSU 904 to V-UE 902 (Path 2: RSU 904→V-UE 902).

From V-UE 902's perspective, V-UE 902 will receive the same PRS twice: first via the PRS transmission traveling Path 2 (LOS) and second via the same PRS transmission traveling Path 1). Given map information (e.g., that indicates at least the existence/location of building D), V-UE 902 may be able to detect the PRS transmission traveling path 1 is a PRS transmission traveling an NLOS transmission path. Further V-UE 9002 may be able to use the map information, in addition to the PRS transmission traveling the NLOS path (Path 1) in a positioning procedure (e.g., to supplement the PRS traveling the LOS path (Path 2)).

Thus, by utilizing map information, the techniques presented herein may extend the applicability of PRS-based positioning in the context of vehicle to everything (V2X) by enabling NLOS-based positioning. NLOS-based positioning described herein may refer to positioning based on PRS measurement information for multiple instances of a PRS transmission traveling only NLOS transmission paths or for multiple instances of a PRS transmission traveling both NLOS transmission paths and LOS transmission paths.

In some aspects, for positioning implementation, pre-PRS messages (e.g., messages transmitted before the PRS transmission/broadcast) may be broadcast from UEs, followed by PRS broadcast from the UEs, and then post-PRS messages (e.g., message transmitted after the PRS transmission/broadcast) are broadcast from UEs. The post-PRS message may include the PRS measurements. In such cases, when map information is available to the UE, such availability may be indicated to other nodes, by the UE, in the pre-PRS message. Similarly, when map information is unavailable to the UE, such unavailability may also be indicated to other nodes, by the UE, in the pre-PRS message. The UEs broadcasting such messages may include RSUs, V-UEs, and pedestrian UEs.

As noted above (with reference to FIGS. 5A-5C), in some cases for vehicle to infrastructure (V2I) positioning, an RSU may broadcast PRS transmissions and a V-UE may also broadcast PRS transmissions. For positioning estimation at the V-UE, for, SL-b positioning, the timing of the PRS transmission broadcast from RSUs may be transmitted to the V-UE, while, for SL-a positioning, the timing of the PRS transmission reception at RSUs may be broadcast to the V-UE. In the case of one or more paths in the environment being NLOS transmission paths (and in the case where the UE indicated the availability of map information), the timing of PRS transmission reception at the RSU may include multiple values corresponding to different times of arrivals, at the RSU, for each PRS instance (along LOS transmission path(s) and/or NLOS transmission path(s)).

In some first cases, a V-UE may broadcast a PRS transmission to other vehicles (vehicle to vehicle (V2V) positioning). For example, a V-UE may broadcast (or transmit) a PRS transmission from the UE, where multiple instances of the PRS transmission are transmitted on different transmission paths between the V-UE and another vehicle. In some second cases, the other vehicle may broadcast a PRS transmission to the V-UE. For example, the other vehicle may broadcast (or transmit) a PRS transmission from the other vehicle, where multiple instances of the PRS transmission re transmitted on different transmission paths between the other vehicle and the V-UE. In either case, the V-UE may detect at least one of the instances of the PRS transmission as a PRS transmission that travel an NLOS transmission path (in some cases, based on map information). In the first cases, for positioning at the vehicle (SL-b positioning), the timing of the (multiple instances of the same) PRS transmission reception at the other vehicle (of the PRS transmission broadcast from the V-UE) may be broadcast to the V-UE, while in the second cases, the timing of the (multiple instances of the same) PRS transmission broadcast from the other vehicle may be transmitted to the V-UE.

The multiple records of time of PRS arrival (for V2I and V2V positioning) may be done by the UE (receiving UEs) measuring the time difference of arrivals for all the significant (LOS transmission and/or NLOS transmission) paths for each PRS transmission.

Target UEs (measuring arrival times of multiple instances of a same PRS transmission) may broadcast the measurement. In some cases, the time of arrivals of multiple instances of the same PRS transmission measured at UEs may be combined with the map information to not only detect which instances of the PRS transmission traveled along NLOS transmission paths but also perform NLOS-based positioning (e.g., positioning based on PRS measurement information for multiple instances of a PRS transmission traveling only NLOS transmission paths or for multiple instances of a PRS transmission traveling both NLOS transmission paths and LOS transmission paths).

In some cases, by reading a pre-PRS message, communications between positioning entities may be configured to share the map information. As noted above, a pre-PRS message may indicate availability of map information at one or more positioning entities. As such, by reading a pre-PRS message, if no map information is available to all entities, then transmission of multiple records (including arrival and/or departure times) of the same PRS transmission (indicating the PRS transmission traveling an NLOS transmission path) may be disabled. On the other hand, if a pre-PRS message indicates map information is available to all entities, then the multiple records of the same PRS may be broadcast (e.g., by a Post-PRS message), The map information exchange (sharing of map information) may be configured by higher layers (e.g., via radio resource control (RRC) signaling). Such an exchange may be done at a different periodicity than a typical PRS transmission cycle (e.g., pre-PRS+PRS+post PRS).

In some case, when PRS transmissions are enabled in the ITS spectrum, the pre-PRS messages and post-PRS messages may be combined (and broadcast as a single message after PRS). In such cases, the availability of the map information at one or more positioning entities may be indicated by the combined message. As the indication of availability may occur after a PRS transmission, a target UE (receiving/measuring PRS) may buffer NLOS samples (e.g., information related to PRS transmissions traveling NLOS transmission paths) in case the map information is available.

While the techniques described herein refer to vehicle positioning applications (e.g., V2I and V2V, collectively V2X), same or similar techniques may be applicable to other positioning use cases, such as for next generation Node-Bs (gNBs) and UEs. V2X represents a likely use case where vehicles are often equipped with map information, or are at least able to access map information. The map information may take on any form and may be obtained in any suitable manner. For example, the map information may include HD map information, local map information regarding one or more reflectors/reflector locations and/or one or more obstacles/obstacle locations (e.g., building location(s), map information trained or learned map from a V-UE, and/or map information accessed from a server or application. Regardless of the type of map information and/or how it is obtained, the techniques presented herein may use the map information to enable NLOS-based positioning.

Example Wireless Communications Devices

Figure 10:
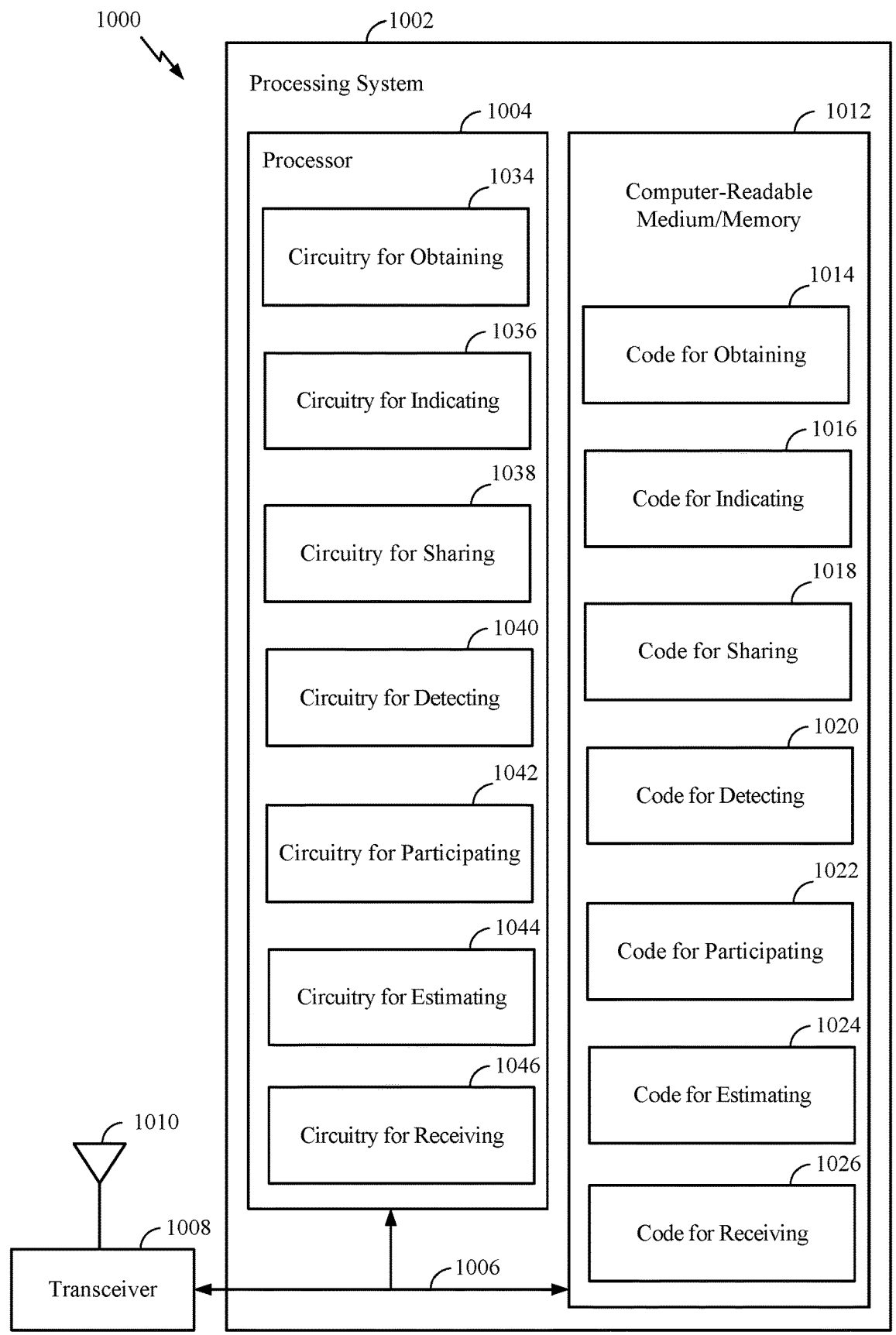
FIG. 10 illustrates a communications device that may include various components configured to perform the operations illustrated in FIG. 6, in accordance with certain aspects of the present disclosure.

FIG. 10 illustrates a communications device 1000 that may include various components (e.g., corresponding to means-plus-function components) operable, configured, or adapted to perform operations for the techniques disclosed herein, such as the operations illustrated in FIG. 6. In some examples, communications device 1000 may be a user equipment (UE), such as UE 120a, as described with respect to FIG. 1 and FIG. 2.

Communications device 1000 includes a processing system 1002 (e.g., corresponding to controller/processor 280) coupled to a transceiver 1008 (e.g., a transmitter and/or a receiver). Transceiver 1008 may correspond to one or more of transmit processor 264, TX MIMO processor 266, modulator/demodulator 254, receive processor 258, and MIMO detector 256 of FIG. 2. Transceiver 1008 is configured to transmit and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by the processor 1004, cause processor 1004 to perform the operations illustrated in FIG. 6, or other operations for performing the various techniques discussed herein. In certain aspects, computer-readable medium/memory 1012 stores code 1014 (an example means for) for obtaining; code 1016 (an example means for) for indicating; code 1018 (an example means for) for sharing; code 1020 (an example means for) for detecting; code 1022 (an example means for) for participating; code 1024 (an example means for) for estimating; and code 1026 (an example means for) for receiving.

In certain aspects, code 1014 for obtaining may include code for obtaining map information. In certain aspects, code 1016 for indicating may include code for indicating an availability of the map information by the UE. In certain aspects, code 1018 for sharing may include code for sharing the map information with one or more other nodes. In certain aspects, code 1020 for detecting may include code for detecting at least one positioning reference signal (PRS) transmission that travels one or more non line-of-sight (NLOS) transmission paths in the environment. In certain aspects, code 1022 for participating may include code for participating in a positioning procedure that estimates a position of the UE based, at least in part, on the at least one PRS transmission that travels the one or more NLOS transmission paths and the map information. In certain aspects, code 1024 for estimating may include code for estimating the position of the UE, by the UE, based, at least in part, on the at least one PRS transmission that travels the one or more NLOS transmission paths and the map information. In certain aspects, code 1026 for receiving may include code for receiving an estimated position of the UE from a roadside service unit (RSU) or server.

In certain aspects, processor 1004 has circuitry configured to implement the code stored in computer-readable medium/memory 1012. Processor 1004 includes circuitry 1034 for (an example means for) for obtaining; circuitry 1036 (an example means for) for indicating; circuitry 1038 (an example means for) for sharing; circuitry 1040 (an example means for) for detecting; circuitry 1042 (an example means for) for participating; circuitry 1044 (an example means for) for estimating; and circuitry 1046 (an example means for) for receiving.

In certain aspects, circuitry 1034 for obtaining may include circuitry for obtaining map information. In certain aspects, circuitry 1036 for indicating may include circuitry for indicating an availability of the map information by the UE. In certain aspects, circuitry 1038 for sharing may include circuitry for sharing the map information with one or more other nodes. In certain aspects, circuitry 1040 for detecting may include circuitry for detecting at least one PRS transmission that travels one or more NLOS transmission paths in the environment. In certain aspects, circuitry 1042 for participating may include circuitry for participating in a positioning procedure that estimates a position of the UE based, at least in part, on the at least one PRS transmission that travels the one or more NLOS transmission paths and the map information. In certain aspects, circuitry 1044 for estimating may include circuitry for estimating the position of the UE, by the UE, based, at least in part, on the at least one PRS transmission that travels the one or more NLOS transmission paths and the map information. In certain aspects, circuitry 1046 for receiving may include circuitry for receiving an estimated position of the UE from an RSU or server.

Figure 11:
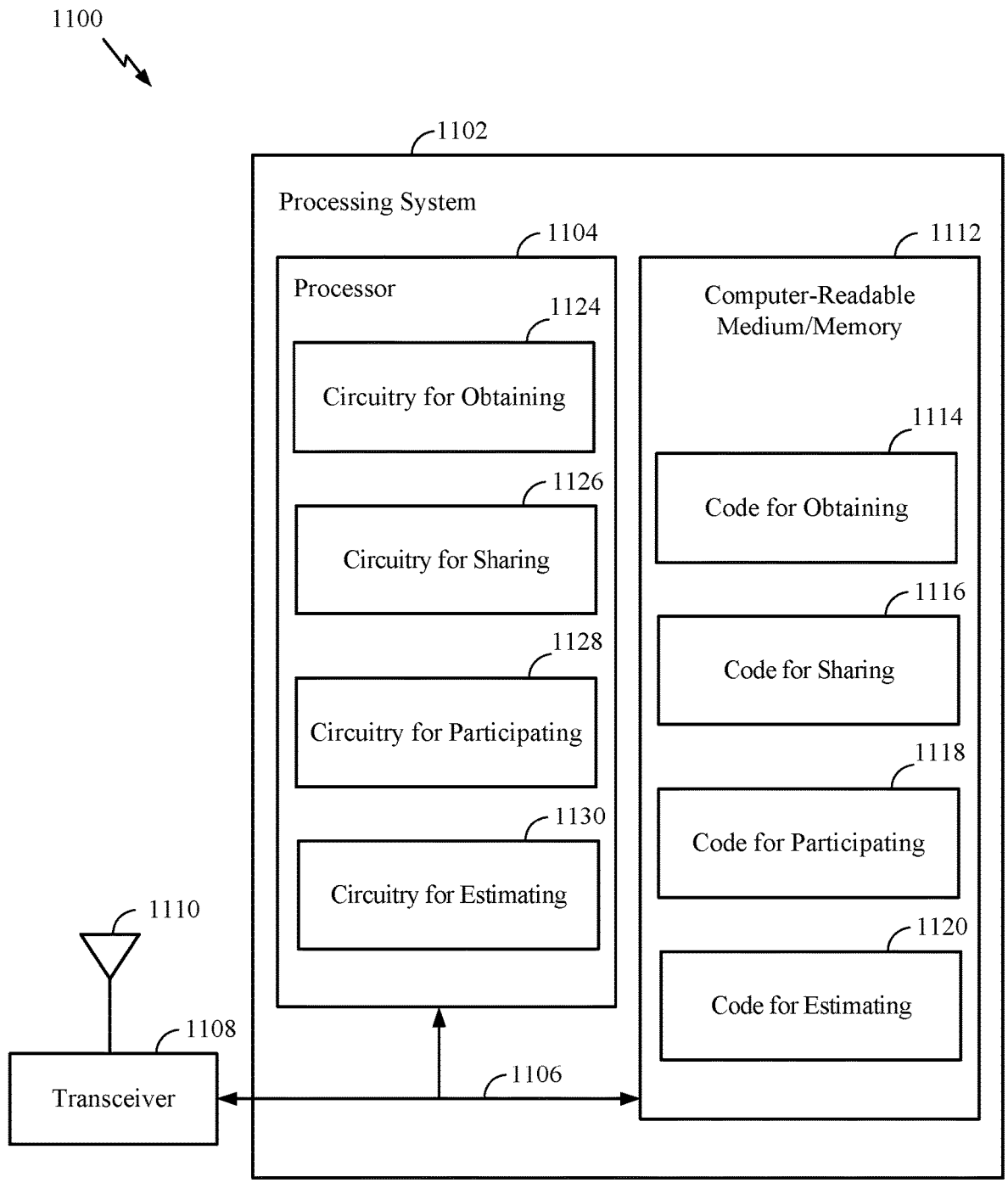
FIG. 11 illustrates a communications device that may include various components configured to perform the operations illustrated in FIG. 7, in accordance with certain aspects of the present disclosure.

FIG. 11 illustrates a communications device 1100 that may include various components (e.g., corresponding to means-plus-function components) operable, configured, or adapted to perform operations for the techniques disclosed herein, such as the operations illustrated in FIG. 7. In some examples, communications device 1000 may be a node or user equipment (UE), such as UE 120a, as described with respect to FIG. 1 and FIG. 2, and more specifically a roadside service unit (RSU), a vehicle UE (V-UE), or a pedestrian UE.

Communications device 1100 includes a processing system 1102 (e.g., corresponding to controller/processor 280) coupled to a transceiver 1108 (e.g., a transmitter and/or a receiver). Transceiver 1008 may correspond to one or more of transmit processor 264, TX MIMO processor 266, modulator/demodulator 254, receive processor 258, and MIMO detector 256 of FIG. 2. Transceiver 1108 is configured to transmit and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 7, or other operations for performing the various techniques discussed herein. In certain aspects, computer-readable medium/memory 1112 stores code 1114 (an example means for) for obtaining; code 1116 (an example means for) for sharing; code 1118 (an example means for) for participating; and code 1120 (an example means for) for estimating.

In certain aspects, code 1114 for obtaining may include code for obtaining an indication that map information regarding, at least, one or more reflectors in an environment including at least a UE and the node is available to the UE. In certain aspects, code 1116 for sharing may include code for sharing the map information with the UE. In certain aspects, code 1118 for participating may include code for participating in a positioning procedure that estimates a position of the UE based, at least in part, on at least one PRS transmission that travels one or more NLOS transmission paths and the map information. In certain aspects, code 1120 for estimating may include code for estimating a position of the UE receiving the at least one PRS transmission that travels the one or more NLOS transmission paths.

In certain aspects, processor 1104 has circuitry configured to implement the code stored in computer-readable medium/memory 1112. Processor 1104 includes circuitry 1124 (an example means for) for obtaining; circuitry 1126 (an example means for) for sharing; circuitry 1128 (an example means for) for participating; and circuitry 1130 (an example means for) for estimating.

In certain aspects, circuitry 1124 for obtaining may include circuitry for obtaining an indication that map information regarding, at least, one or more reflectors in an environment including at least a UE and the node is available to the UE. In certain aspects, circuitry 1126 for sharing may include circuitry for sharing the map information with the UE. In certain aspects, circuitry 1128 for participating may include circuitry for participating in a positioning procedure that estimates a position of the UE based, at least in part, on at least one PRS transmission that travels one or more NLOS transmission paths and the map information. In certain aspects, circuitry 1130 for estimating may include circuitry for estimating a position of the UE receiving the at least one PRS transmission that travels the one or more NLOS transmission paths.

Position manager 122 may support wireless communication in accordance with examples as disclosed herein.

Position manager 122 may be an example of means for performing various aspects described herein. Position manager 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, position manager 122, or its sub-components, may be implemented in code (e.g., as configuration management software or firmware) executed by a processor, or any combination thereof. If implemented in code executed by a processor, the functions of the position manager 122 or 112, or its sub-components may be executed by a general-purpose processor, a DSP, an ASIC, a FPGA or other programmable logic device.

In some examples, position manager 122 may be configured to perform various operations (e.g., receiving, determining, transmitting) using or otherwise in cooperation with transceiver 1008 or 1108.

Position manager 122 or 112, or its sub-components, may be physically located at various positions, including being distributed such that portions of functions are implemented at different physical locations by one or more physical components. In some examples, position manager 122 or 112, or its sub-components, may be a separate and distinct component in accordance with various aspects of the present disclosure. In some examples, the position manager 122 or 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communications by a user equipment (UE), comprising: obtaining map information regarding, at least, one or more reflectors in an environment including at least the UE and another node; detecting at least one positioning reference signal (PRS) transmission that travels one or more non line-of-sight (NLOS) transmission paths in the environment; and participating in a positioning procedure that estimates a position of the UE based, at least in part, on the at least one PRS transmission that travels the one or more NLOS transmission paths and the map information.

Clause 2: The method of Clause 1, wherein detecting the at least one PRS transmission that travels the one or more NLOS transmission paths in the environment is based, at least in part, on the map information.

Clause 3: The method of Clause 1 or 2, wherein participating in the positioning procedure comprises estimating a position of the UE, by the UE, based, at least in part, on the at least one PRS transmission that travels the one or more NLOS transmission paths and the map information.

Clause 4: The method of any of Clauses 1-3, wherein participating in the positioning procedure comprises receiving an estimated position of the UE from a roadside service unit (RSU) or server.

Clause 5: The method of any of Clauses 1-4, wherein the UE comprises a roadside service unit (RSU), a vehicle UE, or a pedestrian UE.

Clause 6: The method of any of Clauses 1-5, further comprising indicating an availability of the map information by the UE.

Clause 7: The method of Clause 6, wherein availability of the map information is indicated via at least one of: a message transmitted before the at least one PRS transmission, or a message transmitted after the at least one PRS transmission.

Clause 8: The method of Clause 6 or 7, further comprising sharing the map information with one or more other nodes.

Clause 9: The method of any of Clauses 1-8, wherein detecting the at least one PRS transmission that travels the one or more NLOS transmission paths in the environment comprises: measuring arrival times of multiple instances of a same PRS transmission transmitted from a node, wherein the same PRS transmission is received on two or more transmission paths between the UE and the node; and detecting one of the instances as the at least one PRS transmission that travels the one or more NLOS transmission paths in the environment.

Clause 10: The method of Clause 9, further comprising broadcasting the arrival times of the multiple instances of the same PRS transmission.

Clause 11: The method of any of Clauses 1-10, wherein detecting the at least one PRS transmission that travels the one or more NLOS transmission paths in the environment comprises: transmitting a PRS transmission from the UE, wherein multiple instances of the PRS transmission are transmitted on different transmission paths between the UE and a node; receiving an indication of arrival times of the multiple instances of the PRS transmission at the node; and detecting one of the instances of the PRS transmission as the at least one PRS transmission that travels the one or more NLOS transmission paths in the environment.

Clause 12: The method of any of Clauses 1-11, wherein the map information comprises at least one of: high definition (HD) map information, local map information further regarding one or more obstacle locations in the environment, map information trained or learned by the UE, or map information obtained from a server.

Clause 13: A method for wireless communications by a node, comprising: obtaining an indication that map information regarding, at least, one or more reflectors in an environment including at least a user equipment (UE) and the node is available to the UE; and participating in a positioning procedure that estimates a position of the UE based, at least in part, on at least one positioning reference signal (PRS) transmission that travels one or more non line-of-sight (NLOS) transmission paths and the map information.

Clause 14: The method of Clause 13, wherein participating in the positioning procedure comprises estimating a position of the UE receiving the at least one PRS transmission that travels the one or more NLOS transmission paths.

Clause 15: The method of Clause 13 or 14, wherein at least one of the node or the UE comprises a roadside service unit (RSU), a vehicle UE, or a pedestrian UE.

Clause 16: The method of any of Clauses 13-15, wherein the indication that the map information is available to the UE is obtained via at least one of: a message transmitted before the at least one PRS transmission, or a message transmitted after the at least one PRS transmission.

Clause 17: The method of any of Clauses 13-16, further comprising sharing the map information with the UE.

Clause 18: The method of any of Clauses 13-17, wherein participating in the positioning procedure comprises transmitting a PRS transmission from the node, wherein multiple instances of the PRS transmission are transmitted on different transmission paths between the node and the UE.

Clause 19: The method of any of Clauses 13-18, wherein participating in the positioning procedure comprises: measuring arrival times of multiple instances of a same PRS transmission transmitted from the UE, wherein the same PRS transmission is received on two or more transmission paths between the node and the UE; and transmitting an indication of the arrival times of the multiple instances of the same PRS transmission to the UE.

Clause 20: The method of Clause 19, wherein the node is configured to transmit the indication of the arrival times of the multiple instances of the same PRS transmission to the UE when the node obtains the indication that the map information is available to the UE.

Clause 21: The method of any of Clauses 13-20, wherein the map information comprises at least one of: high definition (HD) map information, local map information further regarding one or more obstacle locations in the environment, map information trained or learned by the UE, or map information obtained from a server.

Clause 22: An apparatus comprising memory, a transceiver, and at least one processor communicatively coupled to the memory and the transceiver, the at least one processor configured to perform a method in accordance with any one of Clauses 1-21.

Clause 23: An apparatus, comprising means for performing a method in accordance with any one of Clauses 1-21.

Clause 24: A non-transitory computer-readable medium comprising executable instructions that, when executed by one or more processors of an apparatus, cause the apparatus to perform a method in accordance with any one of Clauses 1-21.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC)

devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
obtaining map information regarding, at least, one or more reflectors in an environment including at least the UE and a node;
transmitting a positioning reference signal (PRS) transmission, wherein multiple instances of the PRS transmission travel on different transmission paths between the UE and the node;
receiving an indication of arrival times of the multiple instances of the PRS transmission at the node;
detecting, based on the arrival times, that one of the multiple instances of the PRS transmission travels a non line-of-sight (NLOS) transmission path in the environment;
participating in a positioning procedure that estimates a position of the UE based, at least in part, on the one of the multiple instances of the PRS transmission that travels the NLOS transmission path and the map information;
measuring arrival times of multiple instances of a same PRS transmission received by the UE from the node or another node, wherein the same PRS transmission is received on two or more transmission paths between the UE and the node or the other node; and
broadcasting the arrival times of the multiple instances of the same PRS transmission, based on availability of the map information.

2. The method of claim 1, wherein detecting the one of the multiple instances of the PRS transmission that travels the NLOS transmission path in the environment is based, at least in part, on the map information.

3. The method of claim 1, wherein participating in the positioning procedure comprises estimating the position of the UE based, at least in part, on the one of the multiple instances of the PRS transmission that travels the NLOS transmission path and the map information.

4. The method of claim 1, wherein participating in the positioning procedure comprises receiving an estimated position of the UE from a roadside service unit (RSU) or server.

5. The method of claim 1, wherein the UE comprises a roadside service unit (RSU), a vehicle UE, or a pedestrian UE.

6. The method of claim 1, further comprising indicating an availability of the map information by the UE.

7. The method of claim 6, wherein the availability of the map information is indicated via at least one of:
   a message transmitted before the PRS transmission, or
   a message transmitted after the PRS transmission.

8. The method of claim 6, further comprising sharing the map information with one or more other nodes.

9. The method of claim 1, further comprising:
   detecting one of the multiple instances of the same PRS transmission as another PRS transmission that travels another NLOS transmission path in the environment, based on the arrival times of the multiple instances of the same PRS transmission.

10. The method of claim 1, wherein the map information comprises at least one of:
    high definition (HD) map information;
    local map information further regarding one or more obstacle locations in the environment;
    map information trained or learned by the UE; or
    map information obtained from a server.

11. A method for wireless communications by a node, comprising:
    obtaining an indication that map information regarding one or more reflectors in an environment including at least a user equipment (UE) and the node is available to the UE; and
    participating in a positioning procedure that estimates a position of the UE, wherein participating in the positioning procedure comprises:
      measuring arrival times of multiple instances of a positioning reference signal (PRS) transmission transmitted from the UE, wherein the multiple instances of the PRS transmission are received on two or more transmission paths between the node and the UE;
      transmitting an indication of the arrival times of the multiple instances of the PRS transmission to the UE;
      transmitting another PRS transmission to the UE; and
      receiving a broadcast of arrival times of multiple instances of the other PRS transmission at the UE, based on the map information being available to the node.

12. The method of claim 11, wherein at least one of the node or the UE comprises a roadside service unit (RSU), a vehicle UE, or a pedestrian UE.

13. The method of claim 11, wherein the indication that the map information is available to the UE is obtained via at least one of:
    a message transmitted before the PRS transmission, or
    a message transmitted after the PRS transmission.

14. The method of claim 11, further comprising sharing the map information with the UE.

15. The method of claim 11, wherein transmitting the indication of the arrival times of the multiple instances of the PRS transmission to the UE is in response to obtaining the indication that the map information is available to the UE.

16. The method of claim 11, wherein the map information comprises at least one of:
    high definition (HD) map information,
    local map information further regarding one or more obstacle locations in the environment,
    map information trained or learned by the UE, or
    map information obtained from a server.

17. An apparatus for wireless communications at a user equipment (UE), comprising:
    memory;
    a transceiver; and
    at least one processor communicatively coupled to the memory and the transceiver, the at least one processor configured to:
      obtain map information regarding, at least, one or more reflectors in an environment including at least the apparatus and a node;
      output for transmission a positioning reference signal (PRS) transmission from the UE, wherein multiple instances of the PRS transmission travel on different transmission paths between the UE and the node;
      obtain an indication of arrival times of the multiple instances of the PRS transmission at the node;
      detect, based on the arrival times, that one of the multiple instances of the PRS transmission travels a non line-of-sight (NLOS) transmission path in the environment;
      participate in a positioning procedure that estimates a position of the UE based, at least in part, on the at least one of the multiple instances of the PRS transmission that travels the NLOS transmission path and the map information;
      measure arrival times of multiple instances of a same PRS transmission received by the UE from the node or another node, wherein the same PRS transmission is received on two or more transmission paths between the UE and the node or the other node; and
      broadcast the arrival times of the multiple instances of the same PRS transmission, based on availability of the map information.

18. The apparatus of claim 17, wherein the at least one processor is configured to detect the one of the multiple instances of the PRS transmission that travels the NLOS transmission path in the environment based, at least in part, on the map information.

19. The apparatus of claim 17, wherein the at least one processor being configured to participate in the positioning procedure comprises the at least one processor being configured to estimate the position of the UE based, at least in part, on the one of the multiple instances of the PRS transmission that travels the NLOS transmission path and the map information.

20. The apparatus of claim 17, wherein the at least one processor being configured to participate in the positioning procedure comprises the at least one processor being configured to obtain an estimated position of the UE from a roadside service unit (RSU) or server.

21. The apparatus of claim 17, wherein the UE comprises a roadside service unit (RSU), a vehicle UE, or a pedestrian UE.

22. An apparatus for wireless communications at a node, comprising:
    memory;
    a transceiver; and
    at least one processor communicatively coupled to the memory and the transceiver, the at least one processor configured to:

obtain an indication that map information regarding, at least, one or more reflectors in an environment including at least a user equipment (UE) and the node is available to the UE; and participate in a positioning procedure that estimates a position of the UE, wherein the processor being configured to participate in the positioning procedure comprises the processor being configured to:

measure arrival times of multiple instances of a positioning reference signal (PRS) transmission transmitted from the UE, wherein the multiple instances of the PRS transmission are received on two or more transmission paths between the node and the UE; and output for transmission an indication of the arrival times of the multiple instances of the PRS transmission to the UE;

output for transmission, to the UE, another PRS transmission; and obtain a broadcast of arrival times of multiple instances of the other PRS transmission at the UE, based on the map information being available to the node.

23. The apparatus of claim 22, wherein at least one of the node or the UE comprises a roadside service unit (RSU), a vehicle UE, or a pedestrian UE.

24. The apparatus of claim 22, wherein the at least one processor being configured to obtain the indication that the map information is available to the UE comprises the at least one processor being configured to obtain the indication via at least one of:

a message transmitted before the PRS transmission, or
  a message transmitted after the PRS transmission.

* * * * *